US012424770B2

(12) United States Patent
Chen et al.

(10) Patent No.: US 12,424,770 B2
(45) Date of Patent: Sep. 23, 2025

(54) MULTIBAND ANTENNA ARRAY

(71) Applicant: MEDIATEK INC., Hsinchu (TW)

(72) Inventors: Li-Yu Chen, Hsinchu (TW); Yeh-Chun Kao, Hsinchu (TW); Chih-Wei Lee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 223 days.

(21) Appl. No.: 18/331,398

(22) Filed: Jun. 8, 2023

(65) Prior Publication Data

US 2024/0014572 A1 Jan. 11, 2024

Related U.S. Application Data

(60) Provisional application No. 63/367,822, filed on Jul. 7, 2022.

(51) Int. Cl.
*H01Q 5/10* (2015.01)
*H01Q 21/08* (2006.01)

(52) U.S. Cl.
CPC ............... *H01Q 21/08* (2013.01); *H01Q 5/10* (2015.01)

(58) Field of Classification Search
CPC ................................... H01Q 5/40; H01Q 5/42
See application file for complete search history.

(56) References Cited

U.S. PATENT DOCUMENTS

2015/0372397 A1* 12/2015 Jonsson ................. H01Q 1/246
343/835
2019/0173177 A1* 6/2019 Johansson .............. H01Q 1/246

FOREIGN PATENT DOCUMENTS

DE 102007060083 A1 * 6/2009 ........... H01Q 21/065

* cited by examiner

*Primary Examiner* — Daniel Munoz
(74) *Attorney, Agent, or Firm* — McClure, Qualey & Rodack, LLP

(57) ABSTRACT

A multiband antenna array is provided. The multiband antenna array includes a first multi-band antenna unit, a first high band antenna member, and a first low band antenna member. The first multi-band antenna unit includes a first high band antenna element and a first low band antenna element. A first distance is formed between the center of the first multi-band antenna unit and the center of the first high band antenna member. The first distance is 0.3~0.8 times the wavelength of a high band signal. A second distance is formed between the center of the first multi-band antenna unit and the center of the first low band antenna member. The second distance is 0.3~0.8 times the wavelength of a low band signal.

9 Claims, 6 Drawing Sheets

MULTIBAND ANTENNA ARRAY

CROSS REFERENCE TO RELATED APPLICATIONS

This application claims the benefit of U.S. Provisional Application No. 63/367,822, filed Jul. 7, 2022, the entirety of which is incorporated by reference herein.

BACKGROUND OF THE INVENTION

Field of the Invention

The present invention relates to an antenna array, and, in particular, to a multiband antenna array.

Description of the Related Art

A conventional multiband antenna array includes a plurality of multi-band antenna units. Each multi-band antenna unit includes a high band antenna member and a low band antenna member. The high band antenna member overlaps the low band antenna member. The size of the space between any two of the multi-band antenna units is determined by a compromise of the transmission requirements of the high band performance and the low band performance. However, uniform spacing may lead to a lower realized array gain, due to the coupling between the low band antenna members. Additionally, uniform spacing may also reduce the scan angle for high band signals.

BRIEF SUMMARY OF THE INVENTION

An embodiment of the present invention provides a multiband antenna array. The multiband antenna array includes a first multi-band antenna unit, a first high band antenna member and a first low band antenna member. The first multi-band antenna unit includes a first high band antenna element and a first low band antenna element. The first high band antenna element and the first high band antenna member are adapted to transmit a high band signal. A first distance is formed between the center of the first multi-band antenna unit and the center of the first high band antenna member. The first distance is 0.3~0.8 times the wavelength of the high band signal. The first low band antenna element and the first low band antenna member are adapted to transmit a low band signal. A second distance is formed between the center of the first multi-band antenna unit and the center of the first low band antenna member. The second distance is 0.3~0.8 times the wavelength of the low band signal.

In one embodiment, the first high band antenna element overlaps the first low band antenna element.

In one embodiment, the first multi-band antenna unit, the first high band antenna member and the first low band antenna member are arranged on a first straight line, and the first high band antenna member is located between the first multi-band antenna unit and the first low band antenna member.

In one embodiment, the first distance is half the wavelength of the high band signal, and the second distance is half the wavelength of the low band signal.

In one embodiment, the first high band antenna element, the first low band antenna element, the first high band antenna member and the first low band antenna member are patch antennas.

In one embodiment, the first high band antenna element, the first low band antenna element, the first high band antenna member and the first low band antenna member are dipole antennas.

In one embodiment, the high band signal is higher than 30 GHz, and the low band signal is lower than 30 GHz.

In one embodiment, the high band signal is between 37 GHz~43.5 GHz, and the low band signal is between 24 GHz~29.5 GHz.

In one embodiment, the multiband antenna array further includes a second multi-band antenna unit, a second high band antenna member and a second low band antenna member. The second multi-band antenna unit includes a second high band antenna element and a second low band antenna element, wherein a third distance is formed between the first multi-band antenna unit and the second multi-band antenna unit, and the third distance differs from the first distance and the second distance. The second high band antenna element and the second high band antenna member are adapted to transmit the high band signal, and the first distance is formed between the center of the second multi-band antenna unit and the center of the second high band antenna member. The second low band antenna element and the second low band antenna member are adapted to transmit the low band signal, and the second distance is formed between the center of the second multi-band antenna unit and the center of the second low band antenna member.

In one embodiment, the first multi-band antenna unit, the first high band antenna member, the first low band antenna member, the second multi-band antenna unit, the second high band antenna member and the second low band antenna member are arranged on the first straight line. The first multi-band antenna unit and the second multi-band antenna unit are located between the first high band antenna member and the second high band antenna member.

In one embodiment, the third distance is the average value of the first distance and the second distance.

In one embodiment, the multiband antenna array further includes a third multi-band antenna unit. The third multi-band antenna unit is located between the first multi-band antenna unit and the second multi-band antenna unit. A third distance is formed between the first multi-band antenna unit and the third multi-band antenna unit. The third distance is formed between the second multi-band antenna unit and the third multi-band antenna unit, and the third distance differs from the first distance and the second distance.

In one embodiment, the multiband antenna array further includes a third high band antenna member and a third low band antenna member. The third high band antenna member are adapted to transmit the high band signal, and the first distance is formed between the center of the first multi-band antenna unit and the center of the third high band antenna member. The third low band antenna member are adapted to transmit the low band signal, and the second distance is formed between the center of the first multi-band antenna unit and the center of the third low band antenna member. The first multi-band antenna unit, the third high band antenna member and the third low band antenna member are arranged on a second straight line, and the second straight line is perpendicular to the first straight line.

In another embodiment, a multiband antenna array is provided. The multiband antenna array includes a first multi-band antenna unit, a second multi-band antenna unit and a first single-band antenna member. The first multi-band antenna unit includes a first high band antenna element and a first low band antenna element, wherein the first high band antenna element overlaps the first low band antenna element. The second multi-band antenna unit includes a second high band antenna element and a second low band antenna element. The second high band antenna element overlaps the second low band antenna element. The first high band antenna element and the second high band antenna element are adapted to transmit a high band signal. The first low band antenna element and the second low band antenna element are adapted to transmit a low band signal. A first space is formed between the center of the first multi-band antenna unit and the center of the second multi-band antenna unit. The first single-band antenna member is not overlapped with any other antenna element. The first multi-band antenna unit is located between the second multi-band antenna unit and the first single-band antenna member. A second space is formed between the center of the first multi-band antenna unit and the center of the first single-band antenna member, and the first space differs from the second space.

In one embodiment, the multiband antenna array further includes a second single-band antenna member. The second single-band antenna member is not overlapped with any other antenna element. The first single-band antenna member is located between the second single-band antenna member and the first multi-band antenna unit. A third space is formed between the center of the first single-band antenna member and the center of the second single-band antenna member. The third space differs from the first space. The third space differs from the second space.

In one embodiment, the first multi-band antenna unit, the second multi-band antenna unit, the first single-band antenna member and the second single-band antenna member are arranged on a first straight line.

In one embodiment, the first high band antenna element, the second high band antenna element and the first single-band antenna member are adapted to transmit a high band signal. The first low band antenna element, the second low band antenna element and the second single-band antenna member are adapted to transmit a low band signal.

In one embodiment, the high band signal is higher than 30 GHz, and the low band signal is lower than 30 GHz.

In one embodiment, the multiband antenna array further includes a third single-band antenna member. The third single-band antenna member is not overlapped with any other antenna element. The first multi-band antenna unit and the second multi-band antenna unit are located between the first single-band antenna member and the third single-band antenna member. The second space is formed between the center of the second multi-band antenna unit and the center of the third single-band antenna member.

In one embodiment, the multiband antenna array further includes a fourth single-band antenna member. The fourth single-band antenna member is not overlapped with any other antenna element. The third single-band antenna member is located between the fourth single-band antenna member and the second multi-band antenna unit. The third space is formed between the center of the third single-band antenna member and the center of the fourth single-band antenna member.

In the multiband antenna array of the embodiment of the invention, the first distance is formed between the center of the first multi-band antenna unit and the center of the first high band antenna member, and the first distance is half the wavelength of the high band signal. The second distance is formed between the center of the first multi-band antenna unit and the center of the first low band antenna member, and the second distance is half the wavelength of the low band signal. Therefore, the low-band realized array gain and the high-band scan angle are improved. The multiband antenna array of the embodiment of the invention utilizes hybrid-distance array design to improve the performance thereof, and the size of the multiband antenna array can be minimized. Additionally, the filter loss of the low band antenna member and the filter loss of the high band antenna member are also reduced.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
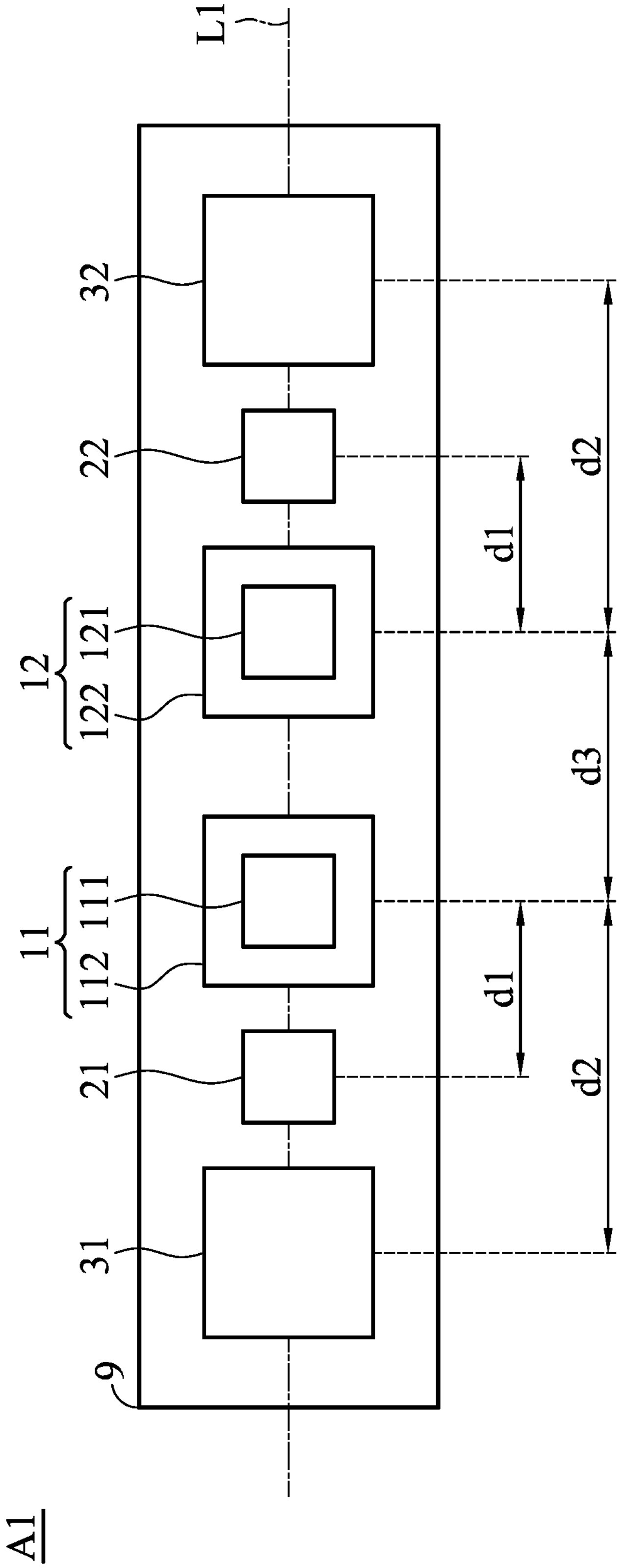
FIG. 1 shows a multiband antenna array of a first embodiment of the invention.

FIG. 1 shows a multiband antenna array of a first embodiment of the invention. With reference to FIG. 1, the multiband antenna array A1 includes a first multi-band antenna unit 11, a first high band antenna member 21 and a first low band antenna member 31. The first multi-band antenna unit 11 includes a first high band antenna element 111 and a first low band antenna element 112. The first high band antenna element 111 and the first high band antenna member 21 are adapted to transmit a high band signal. A first distance d1 is formed between the center of the first multi-band antenna unit 11 and the center of the first high band antenna member 21. The first distance d1 is 0.3~0.8 times the wavelength of the high band signal. The first low band antenna element 112 and the first low band antenna member 31 are adapted to transmit a low band signal. A second distance d2 is formed between the center of the first multi-band antenna unit 11 and the center of the first low band antenna member 31. The second distance d2 is 0.3~0.8 times the wavelength of the low band signal.

In one embodiment, the first multi-band antenna unit 11, the first high band antenna member 21 and the first low band antenna member 31 are disposed on a substrate 9. The disclosure is not meant to restrict the invention.

With reference to FIG. 1, in one embodiment, the first high band antenna element 111 overlaps the first low band antenna element 112.

With reference to FIG. 1, in one embodiment, the first multi-band antenna unit 11, the first high band antenna member 21 and the first low band antenna member 31 are arranged on a first straight line L1. The first high band antenna member 21 is located between the first multi-band antenna unit 11 and the first low band antenna member 31.

With reference to FIG. 1, in one embodiment, the first distance d1 is half the wavelength of the high band signal, and the second distance d2 is half the wavelength of the low band signal.

With reference to FIG. 1, in one embodiment, the first high band antenna element 111, the first low band antenna element 112, the first high band antenna member 21 and the first low band antenna member 31 are patch antennas. However, the disclosure is not meant to restrict the invention. In another embodiment, the first high band antenna element, the first low band antenna element, the first high band antenna member and the first low band antenna member can be dipole antennas.

With reference to FIG. 1, in one embodiment, the high band signal is higher than 30 GHz, and the low band signal is lower than 30 GHz. For example, in one embodiment, the high band signal is between 37 GHz~43.5 GHz, and the low band signal is between 24 GHz~29.5 GHz.

With reference to FIG. 1, in one embodiment, the multi-band antenna array A1 further includes a second multi-band antenna unit 12, a second high band antenna member 22 and a second low band antenna member 32. The second multi-band antenna unit 12 includes a second high band antenna element 121 and a second low band antenna element 122. A third distance d3 is formed between the first multi-band antenna unit 11 and the second multi-band antenna unit 12. The third distance d3 differs from the first distance d1 and the second distance d2. The second high band antenna element 121 and the second high band antenna member 22 are adapted to transmit the high band signal. The first distance d1 is formed between the center of the second multi-band antenna unit 12 and the center of the second high band antenna member 22. The second low band antenna element 122 and the second low band antenna member 32 are adapted to transmit the low band signal. The second distance d2 is formed between the center of the second multi-band antenna unit 12 and the center of the second low band antenna member 32.

With reference to FIG. 1, in one embodiment, the first multi-band antenna unit 11, the first high band antenna member 21, the first low band antenna member 31, the second multi-band antenna unit 12, the second high band antenna member 22 and the second low band antenna member 32 are arranged on the first straight line L1. The first multi-band antenna unit 11 and the second multi-band antenna unit 12 are located between the first high band antenna member 21 and the second high band antenna member 22.

With reference to FIG. 1, in one embodiment, the third distance d3 is the average value of the first distance d1 and the second distance d2. The disclosure is not meant to restrict the invention. For example, the third distance d3 can be slightly higher or lower than the average value of the first distance d1 and the second distance d2.

Figure 2:
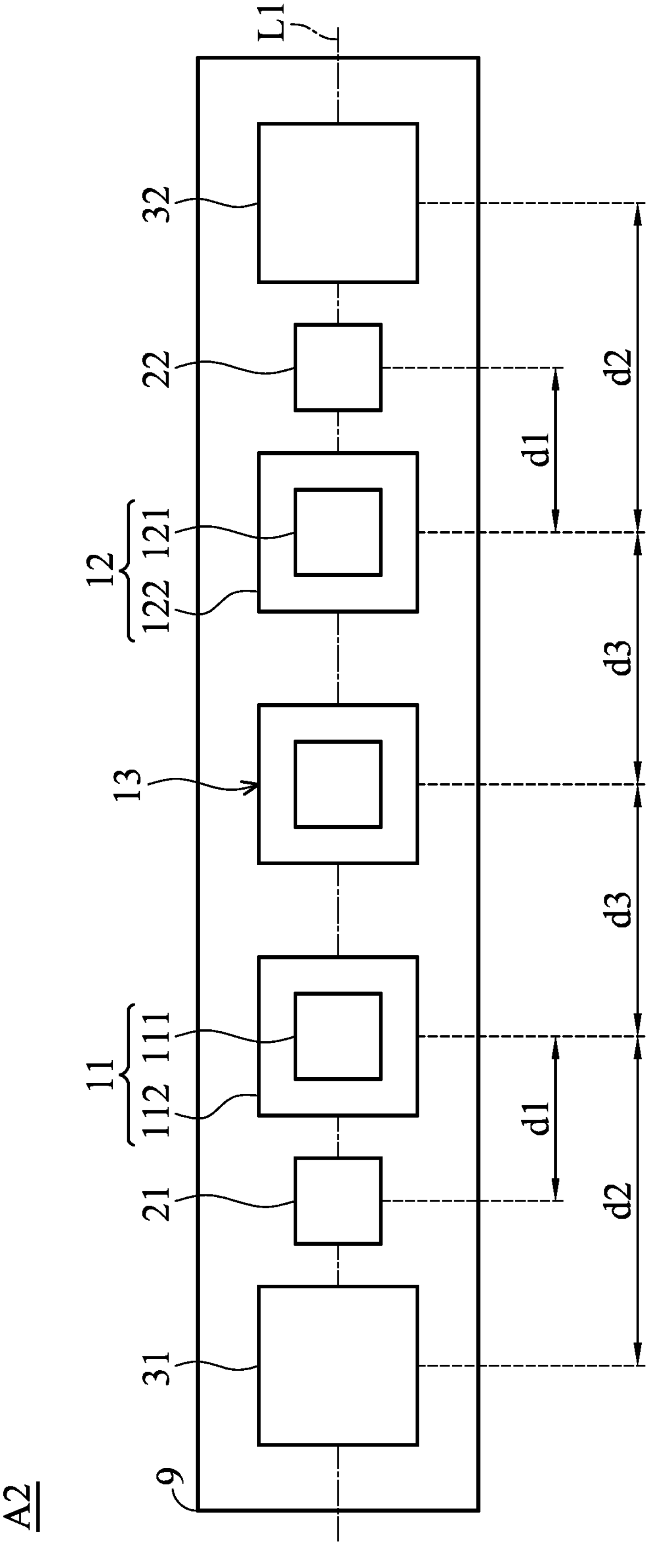
FIG. 2 shows a multiband antenna array of a second embodiment of the invention.

FIG. 2 shows a multiband antenna array of a second embodiment of the invention. With reference to FIG. 2, the multiband antenna array A2 further includes a third multi-band antenna unit 13. The third multi-band antenna unit 13 is located between the first multi-band antenna unit 11 and the second multi-band antenna unit 12. The third distance d3 is formed between the first multi-band antenna unit 11 and the third multi-band antenna unit 13. The third distance d3 is formed between the second multi-band antenna unit 12 and the third multi-band antenna unit 13. The third distance d3 differs from the first distance d1 and the second distance d2.

Figure 3:
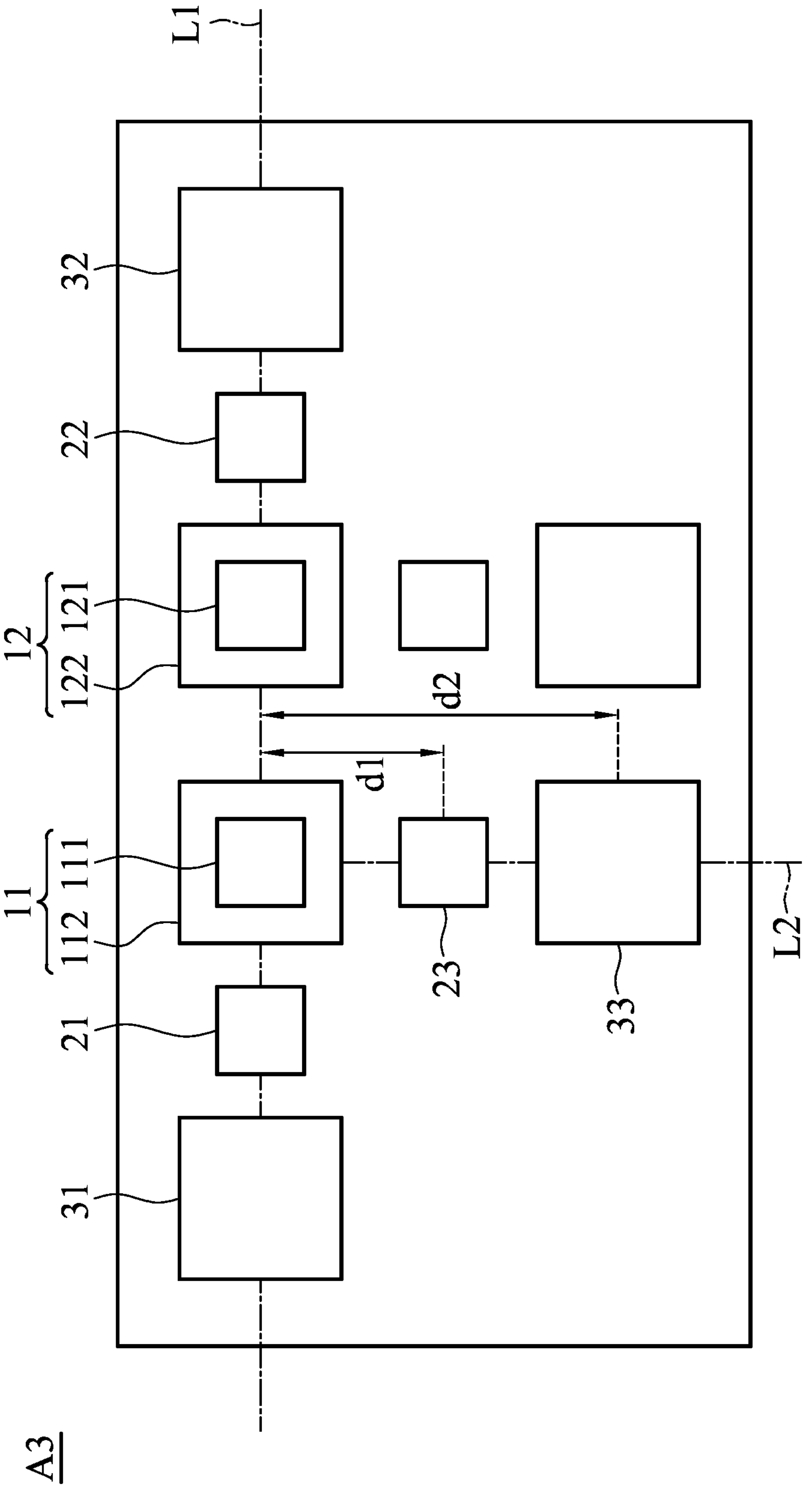
FIG. 3 shows a multiband antenna array of a third embodiment of the invention.

FIG. 3 shows a multiband antenna array of a third embodiment of the invention. With reference to FIG. 3, in one embodiment, the multiband antenna array further includes a third high band antenna member 23 and a third low band antenna member 33. The third high band antenna member 23 are adapted to transmit the high band signal. The first distance d1 is formed between the center of the first multi-band antenna unit 11 and the center of the third high band antenna member 23. The third low band antenna member 33 are adapted to transmit the low band signal. The second distance d2 is formed between the center of the first multi-band antenna unit 11 and the center of the third low band antenna member 33. The first multi-band antenna unit 11, the third high band antenna member 23 and the third low band antenna member 33 are arranged on a second straight line L2. The second straight line L2 is perpendicular to the first straight line L1.

Figure 4:
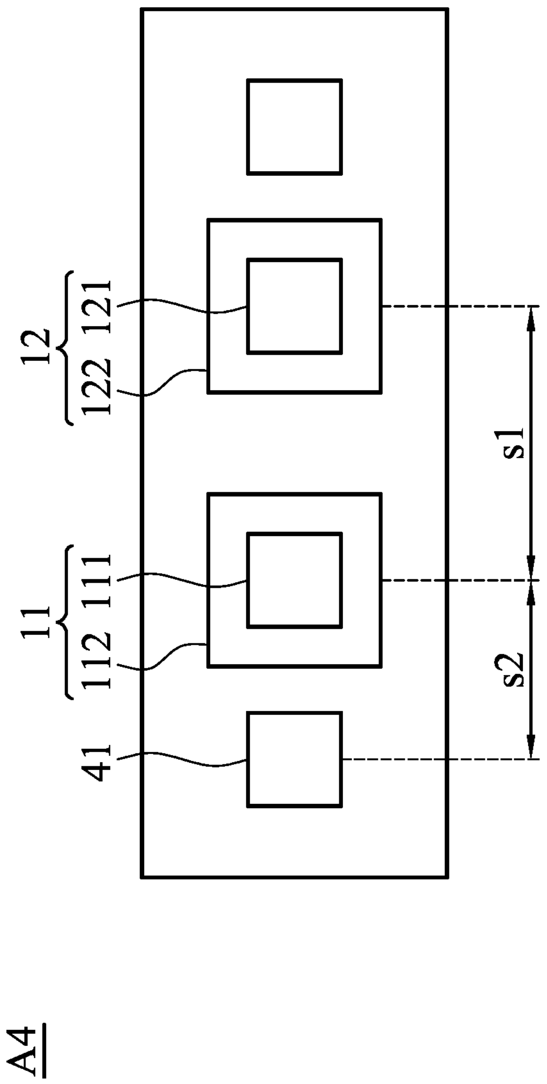
FIG. 4 shows a multiband antenna array of a fourth embodiment of the invention.

FIG. 4 shows a multiband antenna array of a fourth embodiment of the invention. With reference to FIG. 4, in another embodiment, a multiband antenna array A4 is provided. The multiband antenna array A4 includes a first multi-band antenna unit 11, a second multi-band antenna unit 12 and a first single-band antenna member 41. The first multi-band antenna unit 11 includes a first high band antenna element 111 and a first low band antenna element 112, wherein the first high band antenna element 111 overlaps the first low band antenna element 112. The second multi-band antenna unit 12 includes a second high band antenna element 121 and a second low band antenna element 122. The second high band antenna element 121 overlaps the second low band antenna element 122. The first high band antenna element 111 and the second high band antenna element 121 are adapted to transmit a high band signal. The first low band antenna element 112 and the second low band antenna element 122 are adapted to transmit a low band signal. A first space s1 is formed between the center of the first multi-band antenna unit 11 and the center of the second multi-band antenna unit 12. The first single-band antenna member 41 is not overlapped with any other antenna element. The first multi-band antenna unit 11 is located between the second multi-band antenna unit 12 and the first single-band antenna member 41. A second space s2 is formed between the center of the first multi-band antenna unit 11 and the center of the first single-band antenna member 41, and the first space s1 differs from the second space s2.

Figure 5:
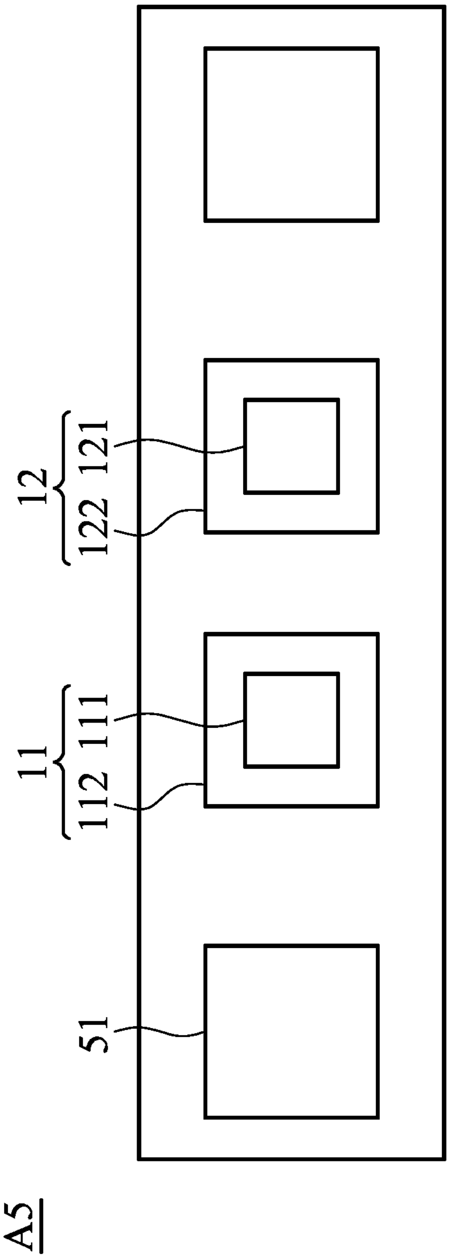
FIG. 5 shows a multiband antenna array of a fifth embodiment of the invention.

In this embodiment, the first single-band antenna member 41 is adapted to transmit a high band signal. However, the disclosure is not meant to restrict the invention. FIG. 5 shows a multiband antenna array of a fifth embodiment of the invention. With reference to FIG. 5, in this embodiment, the multiband antenna array A5 includes the first multi-band antenna unit 11 and the second multi-band antenna unit 12 and a single-band antenna member 51. The single-band antenna member 51 is adapted to transmit a low band signal.

Figure 6:
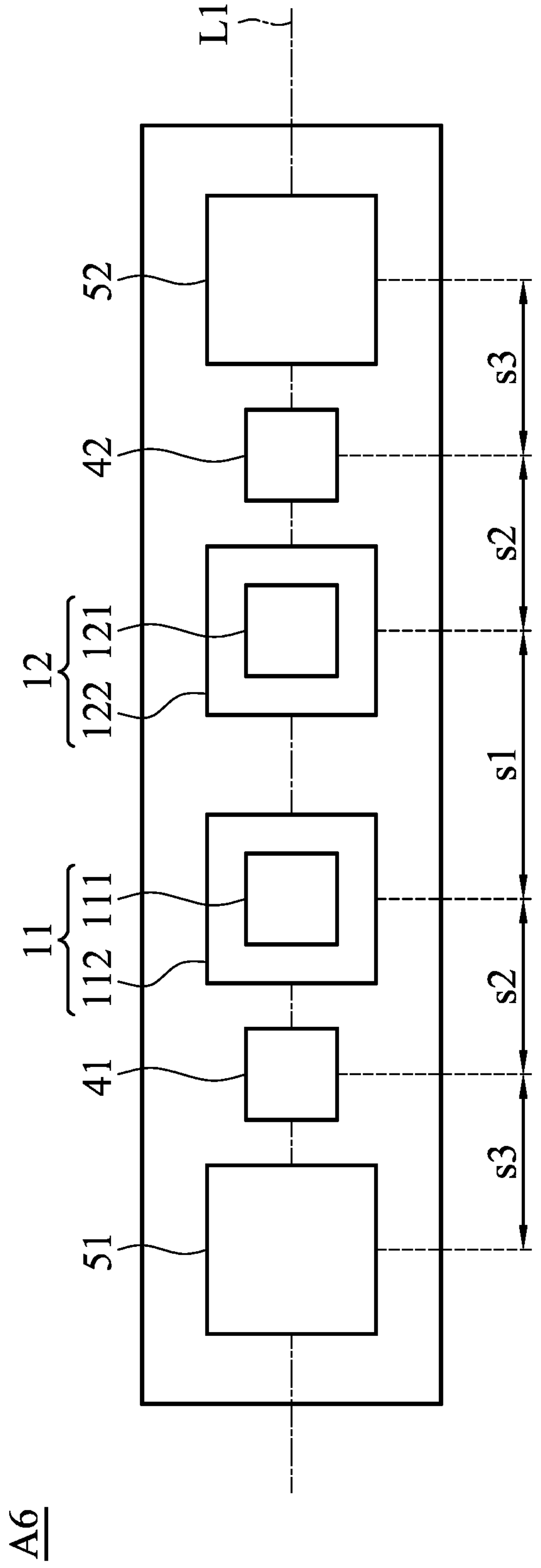
FIG. 6 shows a multiband antenna array of a sixth embodiment of the invention.

FIG. 6 shows a multiband antenna array of a sixth embodiment of the invention. With reference to FIG. 6, in this embodiment, the multiband antenna array A6 includes a first multi-band antenna unit 11, a second multi-band antenna unit 12 and a first single-band antenna member 41. The multiband antenna array A6 further includes a second single-band antenna member 51. The second single-band antenna member 51 is not overlapped with any other antenna element. The first single-band antenna member 41 is located between the second single-band antenna member 51 and the first multi-band antenna unit 11. A third space s3 is formed between the center of the first single-band antenna member 41 and the center of the second single-band antenna member 51. The third space s3 differs from the first space s1. The third space s3 differs from the second space s2. The disclosure is not meant to restrict the invention. For example, the third space s3 maybe equal to the first space s1 or the second space s2.

With reference to FIG. 6, in one embodiment, the first multi-band antenna unit 11, the second multi-band antenna unit 12, the first single-band antenna member 41 and the second single-band antenna member 51 are arranged on a first straight line L1.

With reference to FIG. 6, in one embodiment, the first high band antenna element 111, the second high band antenna element 121 and the first single-band antenna member 41 are adapted to transmit a high band signal. The first low band antenna element 112, the second low band antenna element 122 and the second single-band antenna member 51 are adapted to transmit a low band signal. In one embodiment, the high band signal is higher than 30 GHz, and the low band signal is lower than 30 GHz.

With reference to FIG. 6, in one embodiment, the multi-band antenna array A6 further includes a third single-band antenna member 42. The third single-band antenna member 42 is not overlapped with any other antenna element. The first multi-band antenna unit 11 and the second multi-band antenna unit 12 are located between the first single-band antenna member 41 and the third single-band antenna member 42. The second space s2 is formed between the center of the second multi-band antenna unit 12 and the center of the third single-band antenna member 42.

With reference to FIG. 6, in one embodiment, the multi-band antenna array A6 further includes a fourth single-band antenna member 52. The fourth single-band antenna member 52 is not overlapped with any other antenna element. The third single-band antenna member 42 is located between the fourth single-band antenna member 52 and the second multi-band antenna unit 22. The third space s3 is formed between the center of the third single-band antenna member 42 and the center of the fourth single-band antenna member 52.

In the multiband antenna array of the embodiment of the invention, the first distance is formed between the center of the first multi-band antenna unit and the center of the first high band antenna member, and the first distance is half the wavelength of the high band signal. The second distance is formed between the center of the first multi-band antenna unit and the center of the first low band antenna member, and the second distance is half the wavelength of the low band signal. Therefore, the low-band realized array gain and the high-band scan angle are improved. The multiband antenna array of the embodiment of the invention utilizes hybrid-distance array design to improve the performance thereof, and the size of the multiband antenna array can be minimized. Additionally, the filter loss of the low band antenna member and the filter loss of the high band antenna member are also reduced.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multiband antenna array, comprising:
a first multi-band antenna unit, comprising a first high band antenna element and a first low band antenna element;
a first high band antenna member, wherein the first high band antenna element and the first high band antenna member are adapted to transmit a high band signal, a first distance is formed between the center of the first multi-band antenna unit and the center of the first high band antenna member, and the first distance is 0.3~0.8 times the wavelength of the high band signal; and
a first low band antenna member, wherein the first low band antenna element and the first low band antenna member are adapted to transmit a low band signal, a second distance is formed between the center of the first multi-band antenna unit and the center of the first low band antenna member, and the second distance is 0.3~0.8 times the wavelength of the low band signal, wherein the first high band antenna element overlaps the first low band antenna element, the first multi-band antenna unit, the first high band antenna member and the first low band antenna member are arranged on a first straight line, and the first high band antenna member is located between the first multi-band antenna unit and the first low band antenna member;
a second multi-band antenna unit, comprising a second high band antenna element and a second low band antenna element, wherein a third distance is formed between the first multi-band antenna unit and the second multi-band antenna unit, and the third distance differs from the first distance and the second distance;
a second high band antenna member, wherein the second high band antenna element and the second high band antenna member are adapted to transmit the high band signal, and the first distance is formed between the center of the second multi-band antenna unit and the center of the second high band antenna member; and
a second low band antenna member, wherein the second low band antenna element and the second low band antenna member are adapted to transmit the low band signal, and the second distance is formed between the center of the second multi-band antenna unit and the center of the second low band antenna member.

2. The multiband antenna array as claimed in claim 1, wherein the first distance is half the wavelength of the high band signal, and the second distance is half the wavelength of the low band signal.

3. The multiband antenna array as claimed in claim 1, wherein the first high band antenna element, the first low band antenna element, the first high band antenna member and the first low band antenna member are patch antennas.

4. The multiband antenna array as claimed in claim 1, wherein the first high band antenna element, the first low band antenna element, the first high band antenna member and the first low band antenna member are dipole antennas.

5. The multiband antenna array as claimed in claim 1, wherein the high band signal is higher than 30 GHz, and the low band signal is lower than 30 GHz.

6. The multiband antenna array as claimed in claim 5, wherein the high band signal is between 37 GHz~43.5 GHZ, and the low band signal is between 24 GHz~29.5 GHz.

7. The multiband antenna array as claimed in claim 1, wherein the first multi-band antenna unit, the first high band antenna member, the first low band antenna member, the second multi-band antenna unit, the second high band antenna member and the second low band antenna member are arranged on the first straight line, and the first multi-band antenna unit and the second multi-band antenna unit are located between the first high band antenna member and the second high band antenna member.

8. The multiband antenna array as claimed in claim 1, wherein the third distance is an average value of the first distance and the second distance.

9. A multiband antenna array, comprising:

a first multi-band antenna unit, comprising a first high band antenna element and a first low band antenna element;

a first high band antenna member, wherein the first high band antenna element and the first high band antenna member are adapted to transmit a high band signal, a first distance is formed between the center of the first multi-band antenna unit and the center of the first high band antenna member, and the first distance is 0.3~0.8 times the wavelength of the high band signal; and a first low band antenna member, wherein the first low band antenna element and the first low band antenna member are adapted to transmit a low band signal, a second distance is formed between the center of the first multi-band antenna unit and the center of the first low band antenna member, and the second distance is 0.3~0.8 times the wavelength of the low band signal, wherein the first high band antenna element overlaps the first low band antenna element, the first multi-band antenna unit, the first high band antenna member and the first low band antenna member are arranged on a first straight line, and the first high band antenna member is located between the first multi-band antenna unit and the first low band antenna member;

a second multi-band antenna unit, comprising a second high band antenna element and a second low band antenna element, a third multi-band antenna unit, located between the first multi-band antenna unit and the second multi-band antenna unit, wherein a third distance is formed between the first multi-band antenna unit and the third multi-band antenna unit, the third distance is formed between the second multi-band antenna unit and the third multi-band antenna unit, and the third distance differs from the first distance and the second distance;

a second high band antenna member, wherein the second high band antenna element and the second high band antenna member are adapted to transmit the high band signal, and the first distance is formed between the center of the second multi-band antenna unit and the center of the second high band antenna member; and a second low band antenna member, wherein the second low band antenna element and the second low band antenna member are adapted to transmit the low band signal, and the second distance is formed between the center of the second multi-band antenna unit and the center of the second low band antenna member.

* * * * *